Aug. 21, 1934.                L. L. HOWARD                1,971,219
                        COMMUTATOR INSULATING RING
                             Filed May 3, 1934
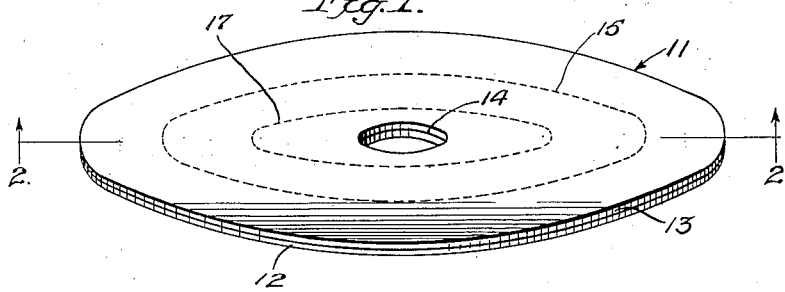
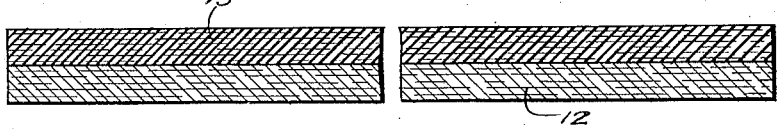
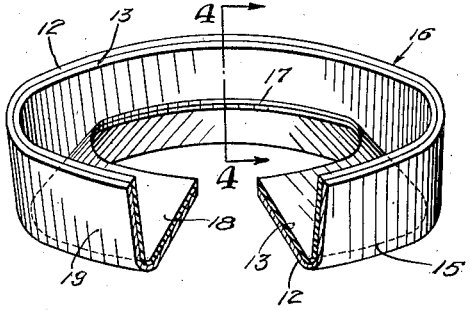
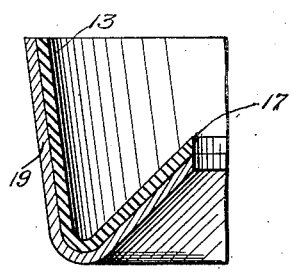
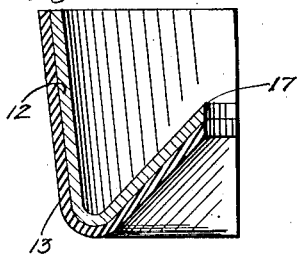
Inventor:—
Leonard L. Howard
by his Attorneys
Howson & Howson Patented Aug. 21, 1934

1,971,219

UNITED STATES PATENT OFFICE 1,971,219

COMMUTATOR INSULATING RING

Leonard L. Howard, Valparaiso, Ind., assignor to Continental-Diamond Fibre Company, Newark, Del., a corporation of Delaware Application May 3, 1934, Serial No. 723,804

4 Claims. (Cl. 171—320)

This invention relates to commutator insulating rings. Such rings have previously been formed of mica plate which is a well known product comprising flakes of mica bonded together by means of a binder such as shellac or other suitable natural or synthetic resin. Mica plate is plastic when heated and may be formed to a desired shape by suitably configurating the material in a mold, the configuration being permitted by the slippage of the superposed flakes over each other due to the fluidity of the binder obtained when the material is heated.

Mica plate is comparatively expensive and insulating rings made therefrom are subject to several disadvantages. Insulating rings are subjected to severe operating conditions as they are used as a part of dynamo electric machines, which are frequently overloaded and consequently overheated. Unusual heating of the mica ring coupled with the pressure exerted thereon by the adjacent parts of the machine, has a tendency to cause the mica flakes to slip out of place. In assembling commutators, also, especially during the tinning operation, insulating rings are frequently subjected to temperatures sufficiently high to cause slippage of the mica flakes of which they are formed, and, during the clamping operation, the insulating ring is subjected to considerable pressure which frequently forces the flakes out of place.

Commutator rings also should have uniform thickness at all points in their circumference in order to enable commutators to be assembled in volume without having what is commonly known as "high bars", which are caused when the insulating rings are not uniform in thickness. Commutators having "high bars" are frequently rejected by the manufacturer which increases the expense of production and thus forms an undesirable feature in the manufacture of commutators.

An object of the present invention is to overcome the foregoing defects and to provide a composite insulating ring for commutators having the desired mechanical strength and being of substantially even thickness throughout.

Another object of the invention is to provide a composite commutator ring having high resistance to mechanical deterioration at the high temperatures and pressures to which the ring may be subjected in service.

Still another object of the invention is to provide a composite commutator ring comprising a mica layer and a layer of fabric bonded together by a suitable binder to form an integral unitary article having the desired characteristics.

Numerous other objects and advantages will be apparent from the following description and the accompanying drawing.

In the drawing:

Figure 1 is a perspective view of a preformed composite disc from which the improved commutator ring may be formed;

Figure 2 is an enlarged sectional view taken along line 2—2 of Figure 1;

Figure 3 is a perspective view of a commutator ring molded from the blank shown in Figure 1 and having a portion cut out for clarity of illustration;

Figure 4 is an enlarged partial section taken along line 4—4 of Figure 3; and

Figure 5 is a similar sectional view illustrating an alternative construction.

Commutator insulating rings have heretofore been formed from discs of mica plate in which the bond content ranges between 10% and 20% of the weight of mica plate used, and in forming insulating rings from which plate having such a percentage of bonding material, it is necessary to provide a blank having a total thickness considerably in excess of the thickness of the finished ring. The blank or disc is then drawn in a die to the finished shape which is substantially as shown in Figure 3 of the drawing. In practice, it is usual to build up the blanks from which rings are to be made by superposing preformed discs of mica plate for the reason that a solid disc of the necessary thickness does not produce a satisfactory ring because of the buckling and rupturing of mica along the line of bend. In forming the rings, the stack of discs are compressed and any excess material is forced out of the mold and cut off at the rim of the ring. This process produces a ring having a relatively high bond content which tends to become oozy when subjected to heat or pressure or both. By "oozy", I mean that the mica flakes have a tendency to slip due to the plasticity of the binder when heated, and it will be readily appreciated that when a ring becomes oozy its mechanical strength is reduced and it cannot maintain its form under pressure. By reducing the bond content, slippage is reduced, but if the bond content is reduced below 10% of the weight of the mica ring the product becomes mechanically weak and flaky, and the flakes will not retain their molded position, particularly along the line of bend since the flakes tend to flatten out.

It is the purpose of this invention to provide a commutator ring which is capable of maintaining its form while, at the same time, an internal slippage of the mica flakes is reduced to a minimum. To this end, there is provided a ring having a layer or shell of mica plate which may be relatively thin, and a backing shell of resin-impregnated fabric material bonded to the mica plate. The fabric used may be canvas, duck, or similar woven fabric.

The layer of mica plate may be formed by binding mica flakes together with any of the resins employed in the manufacture of mica plate, for example, shellac, Manila gum or resin of the glyptal type prepared by reacting a polybasic organic acid and a polyhydric alcohol, such as a phthalic anhydride-glycerol resin. The fabric is also impregnated with a resin which may be shellac, Manila gum or glyptal, but in most instances and in the preferred form, it is impregnated with a thermosetting resin, preferably of the phenolic type such as phenol-formaldehyde, phenol-glycerol, or phenol-furfural resin or the like. These thermosetting resins, as is well known, are fusible and soluble in the initial stage but may be converted into a hard, infusible, insoluble product by heat and pressure.

Referring to the drawing, the improved commutator ring may be formed by first preforming a disc of mica plate 12 and a disc 13 formed of resin-impregnated fabric such as above specified. The discs are arranged in superposed relation, as shown, to form a composite blank 11. If the binders employed in conjunction with the mica plate and fabric are both dry before assembling and it is desired to secure the discs together to facilitate handling, they may be formed by placing a binder between them or a solvent for one of the binders may be placed at spaced points on the disc. Alternatively rather than cutting the discs of mica plate and resin-impregnated fabric prior to assembly, the mica plate and resin-impregnated fabric may be assembled in sheet form and caused to adhere together by the application of heat, a solvent for the resin, or a binder, and the assembled discs then punched from the composite sheet. In this method, each disc requires only one punching operation in its production.

In forming a commutator ring from the blank shown in Figure 1, any suitable method may be employed, for instance, the blank may be introduced into a suitable mold and compacted to the final form desired, using heat in conjunction with the pressure of the mold. If fabric impregnated with a thermosetting resin is employed, the heating step is sufficient to convert the resin to the final, insoluble, infusible stage. Preferably, the blank, irrespective of the resins employed as binders, is preheated for approximately one minute at a temperature dependent upon the particular binders employed, and is then subjected to pressure in a cold mold for about five seconds. While this method is preferred, the invention is not limited thereto and contemplates any method involving pressure, and heat sufficient to render the binders plastic. The blank is provided with a central aperture 14 for the purpose of aligning the same in the die. The blank is bent in the die along the line of bend 15 into an annular ring of substantially V-shaped cross section, the central portions of the disc being cut out along the line 17 by the operation of the die during the molding. The finished ring is illustrated in Figures 3 and 4 wherein the inner layer 18 of the ring is formed of the binder-treated fabric, while the outer layer 19 comprises mica flakes.

In Figure 5, there is shown a modification wherein the fabric layer is placed upon the outside of the mica layer instead of upon the inside thereof, as in the previously described embodiment. Aside from this modification in structure, this form of the invention is substantially the same as that above described and the alternative product may be made by the same methods.

Insulating rings formed in accordance with the foregoing description are particularly well adapted for service for the reason that they are mechanically stronger than rings made entirely of mica and they have all the insulating properties of rings made entirely of mica. I am aware of the fact that attempts have been made in the past to provide insulating rings for commutators formed entirely of heat-curable material such as for the reaction products of phenol and formaldehyde. These attempts have been unsuccessful for the reason that such rings have a tendency to become oil soaked and to carbonize at their outer surfaces when dirt collects upon the oil soaked surface. Under such conditions, a flash-over frequently occurs with the result that the commutator is burned out.

It is thought that the invention and numerous of its attendant advantages will be apparent from the foregoing description, and it is obvious that numerous changes may be made in the form, construction, and arrangement of the various parts without departing from the spirit and scope of the invention or sacrificing any of its material advantages.

I claim:

1. A composite commutator ring comprising a layer of mica plate and a layer of resin-impregnated fabric, the layers being bonded together to form a unitary article.

2. A composite commutator ring comprising a layer of mica plate and a layer of fabric impregnated with a thermosetting resin in its insoluble, infusible stage, the layers being bonded together to form a unitary article.

3. A composite commutator ring comprising a layer of mica plate and a layer of fabric impregnated with a phenolic resin in its insoluble, infusible stage, the layers being bonded together to form a unitary article.

4. A composite commutator ring comprising a layer of mica plate and a layer of fabric impregnated with a phenol-formaldehyde resin in its insoluble, infusible stage, the layers being bonded together to form a unitary article.

LEONARD L. HOWARD.